(12) United States Patent
Merten et al.

(10) Patent No.: US 8,727,452 B2
(45) Date of Patent: May 20, 2014

(54) TRACTOR WHEELS

(75) Inventors: David J. Merten, Manitowoc, WI (US);
Jay Z. Muchin, Manitowoc, WI (US);
Michael Potempa, Freeport, IL (US);
Brian Potempa, Freeport, IL (US)

(73) Assignee: M Group, Inc., Manitowoc, WI (US)

( * ) Notice: Subject to any disclaimer, the term of this patent is extended or adjusted under 35 U.S.C. 154(b) by 385 days.

(21) Appl. No.: 13/088,202

(22) Filed: Apr. 15, 2011

(65) Prior Publication Data

US 2012/0169110 A1 Jul. 5, 2012

Related U.S. Application Data

(63) Continuation-in-part of application No. 29/382,517, filed on Jan. 4, 2011, now Pat. No. Des. 668,200.

(51) Int. Cl.
*B60B 7/10* (2006.01)
*B60B 7/04* (2006.01)
*B60B 7/18* (2006.01)

(52) U.S. Cl.
USPC ............. 301/37.34; 301/37.102; 301/37.106; 301/37.42

(58) Field of Classification Search
USPC ................ 301/37.101, 37.26, 37.28, 37.102, 301/37.31, 35.34, 37.35, 37.36, 37, 37.106, 301/37.108, 37.42
See application file for complete search history.

(56) References Cited

U.S. PATENT DOCUMENTS

| | | | |
|---|---|---|---|
| 3,528,705 A | | 9/1970 | Oldroyd |
| 3,724,905 A | | 4/1973 | Kachler |
| 3,860,295 A | | 1/1975 | Beisch |
| 4,418,962 A | | 12/1983 | Schaffer |
| 4,441,762 A | | 4/1984 | Segal |
| 5,316,376 A | | 5/1994 | Defreitas |
| 5,659,989 A | | 8/1997 | Hsiao et al. |
| 5,931,543 A | | 8/1999 | Smith |
| 5,957,541 A | * | 9/1999 | Seigler ........................ 301/5.301 |
| 6,283,557 B1 | * | 9/2001 | Okajima et al. ......... 301/95.104 |
| 6,575,537 B1 | * | 6/2003 | Wang ......................... 301/37.23 |
| 6,860,568 B2 | | 3/2005 | Nunes |
| 6,926,369 B2 | | 8/2005 | McCaster, III et al. |
| 7,210,746 B2 | | 5/2007 | Ryu |
| 7,314,255 B2 | * | 1/2008 | Wang ......................... 301/37.33 |
| 8,276,992 B2 | * | 10/2012 | Smith ...................... 301/37.376 |
| 2003/0155804 A1 | | 8/2003 | Weckman, Jr. et al. |
| 2005/0280307 A1 | * | 12/2005 | Wood ......................... 301/37.35 |
| 2010/0052408 A1 | * | 3/2010 | Ren ................................ 301/5.1 |

OTHER PUBLICATIONS

Rainbow Custom Cars Inc. Golf Carts & Motorsports Superstore, copyright © 2011, accessed from http://www.rainbowcustomcars.com/category/hubcaps/ on Apr. 15, 2011, 2 pages.
Plazco, copyright © 2008, accessed from http://www.plazco.com/WheelCoversbyPlazco/tabid/54/Default.aspx on Apr. 15, 2011, 1 page.

(Continued)

*Primary Examiner* — Kip T Kotter
*Assistant Examiner* — Jean Charleston
(74) *Attorney, Agent, or Firm* — Reinhart Boerner Van Deuren s.c.

(57) ABSTRACT

Improved variable color wheel covers for tractor wheels are provided.

15 Claims, 5 Drawing Sheets

(56) References Cited

OTHER PUBLICATIONS

Plazco, copyright © 2008, The Beadlock NT, accessed from http://www.plazco.com/WheelCoversbyPlazco/BeadlockAT/tabid/55/Default.aspx on Apr. 15, 2011, 2 pages.
Plazco, copyright © 2008, The Sport Edition, accessed from http://www.plazco.com/WheelCoversbyPlazco/SportEdition/tabid/60/Default.aspx on Apr. 15, 2011, 1 page.
Plazco, copyright © 2008, SS Wheel Cover, accessed from http://www.plazco.com/WheelCoversbyPlazco/SSWheelCoverbyPlazco/tabid/56/Default.aspx on Apr. 15, 2011, 1 page.
Plazco, copyright © 2008, Maxam Wheel Covers, accessed from http://www.plazco.com/WheelCoversbyPlazco/Maxam/tabid/61/Default.aspx on Apr. 15, 2011, 1 page.
Plazco, copyright © 2008, Turbine Wheel Covers, accessed from http://www.plazco.com/WheelCoversbyPlazco/Turbine/tabid/63/Default.aspx on Apr. 15, 2011, 1 page.

* cited by examiner

US 8,727,452 B2

TRACTOR WHEELS

CROSS-REFERENCE TO RELATED APPLICATION

This application is a continuation-in-part of prior U.S. patent application Ser. No. 29/382,517 filed on Jan. 4, 2011, all of which is incorporated herein by reference.

BACKGROUND

The present invention relates generally to the field of improved tractor wheels. More specifically, the present invention relates to wheel covers for tractor vehicles such as riding lawnmowers.

SUMMARY

One embodiment of the invention relates to a wheel cover, including a wheel cover frame. The wheel cover frame includes a circular ring, a skirt extending from the circular ring, a center hub, a plurality of spokes, and an opaque cover assembly. The wheel cover frame is fabricated from a material having a first color. The circular ring has a diameter between 4 and 12 inches. The skirt is fastened to the circular ring in a position which is perpendicular to the ring. The skirt is comprised of friction members to engage the ring with the wheel. A plurality of spokes extends between the ring and the hub to support the hub. There are an equal number of spokes and openings. The opaque cover assembly is fabricated from a material having a second color different than the wheel cover frame. The cover assembly is fastened to the wheel cover frame to close all of the openings. The cover assembly provides for an access port for an air valve of the wheel.

Another embodiment of the invention provides for a plastic wheel cover which covers substantially all of the area of the perimeter of one side of a wheel. The plastic wheel cover frame includes a circular ring, a skirt extending from the circular ring, a center hub, and an opaque plastic cover assembly. A structure extends between the ring and the hub to support the hub. The volume within the frame is defined by the ring, skirt, and hub. The cover assembly provides for an access port for an air valve of the wheel.

Yet another embodiment of the invention provides for a plastic wheel cover which covers substantially all of the area of the perimeter of one side of a wheel. The plastic wheel cover frame includes a circular ring, a skirt extending from the circular ring, a center hub, and an opaque plastic cover assembly. There are five spokes extending between the ring and the hub to support the hub. The volume within the frame is defined by the ring, skirt, and hub. The opaque plastic cover assembly is fabricated from a material having a chrome color surface, the color being one of the group of green, red, yellow, gray, black or orange. The plastic cover assembly is fixed to the wheel frame and provides for an access port for an air valve of the wheel.

Still another embodiment of the invention relates to commercialization of a vehicle wheel, tire, and wheel cover. The wheel cover frame includes a circular ring, a skirt extending from the circular ring, a center hub, a plurality of spokes, and an opaque cover assembly for which to engage with a wheel. The commercialization of the wheel cover frame provides for engagement with a wheel.

A further embodiment of the invention relates to a wheel cover kit comprising a pair of wheel covers. Each wheel cover frame includes a circular ring, a skirt extending from the circular ring, a center hub, a plurality of spokes, and an opaque cover assembly which is made available through a package which at least partially encloses and supports the wheel covers relative to each other. The package includes a structure which permits it to hang from a rack.

DETAILED DESCRIPTION

Figure 1:
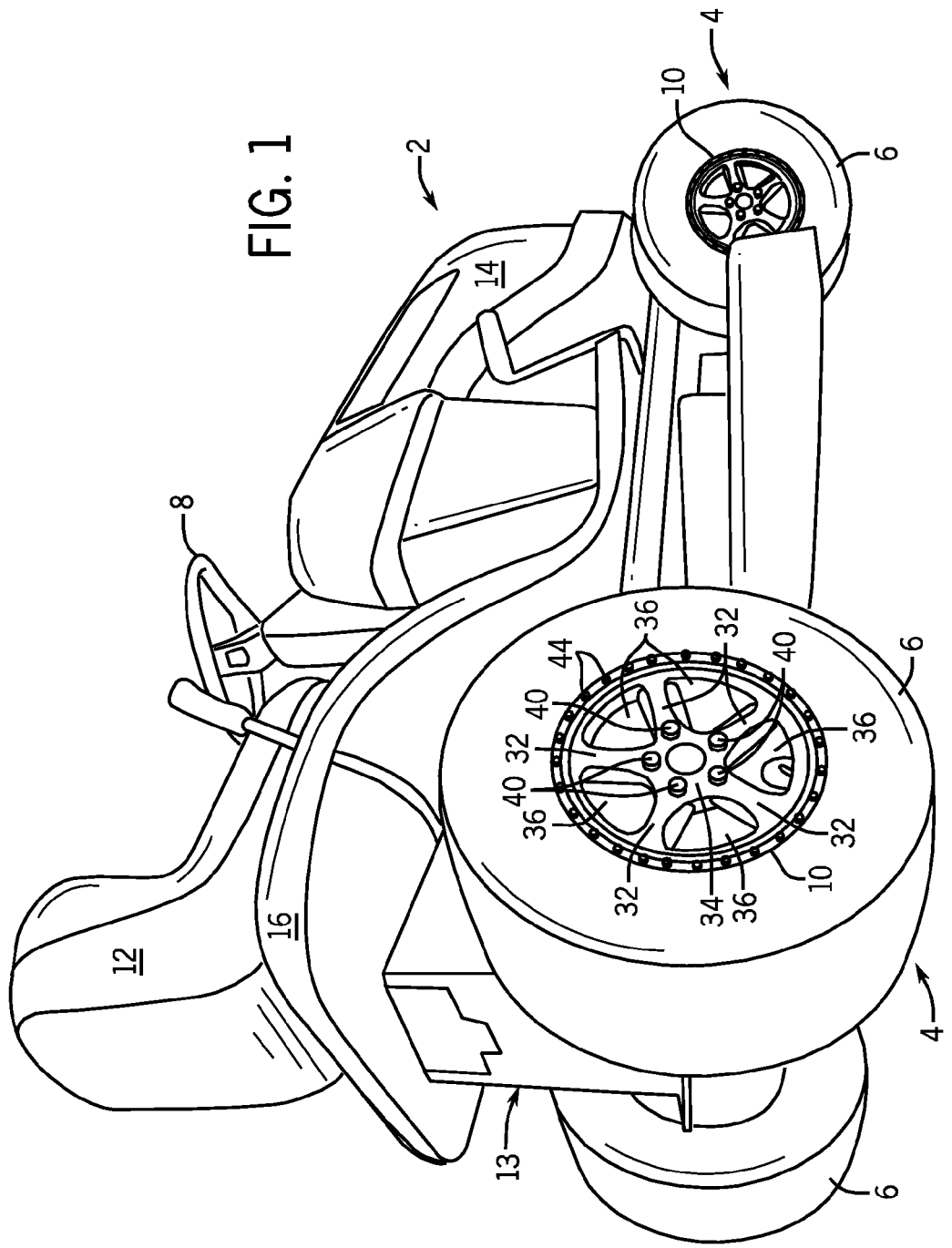
FIG. 1 is a rear perspective view of a tractor including improved wheels.

A tractor 2 shown in FIG. 1 can be a standard riding lawnmower tractor, with vastly improved wheels 4. Tractor 2 includes a chassis supported by four tires 6 (three tires illustrated in FIG. 1) mounted on four, respective wheels (alternatively referred to as rims) 10. The front wheels are steerable via a steering wheel 8 supported relative to a seat 12, both supported by the chassis 13. Tractor 2 may have one of a range of colors or combination of color including, for example, white, green, red, yellow, gray, black, or orange. Typically, the wheels 10 are painted with a primary color or the color of the hood 14 or fenders 16 of tractor 2. However, as the tractor 2 ages, the wheels 10 typically become chipped and or rusted and relatively unsightly. In many cases even when the wheels 10 are new, they are relatively uninteresting in appearance.

Figure 2A:
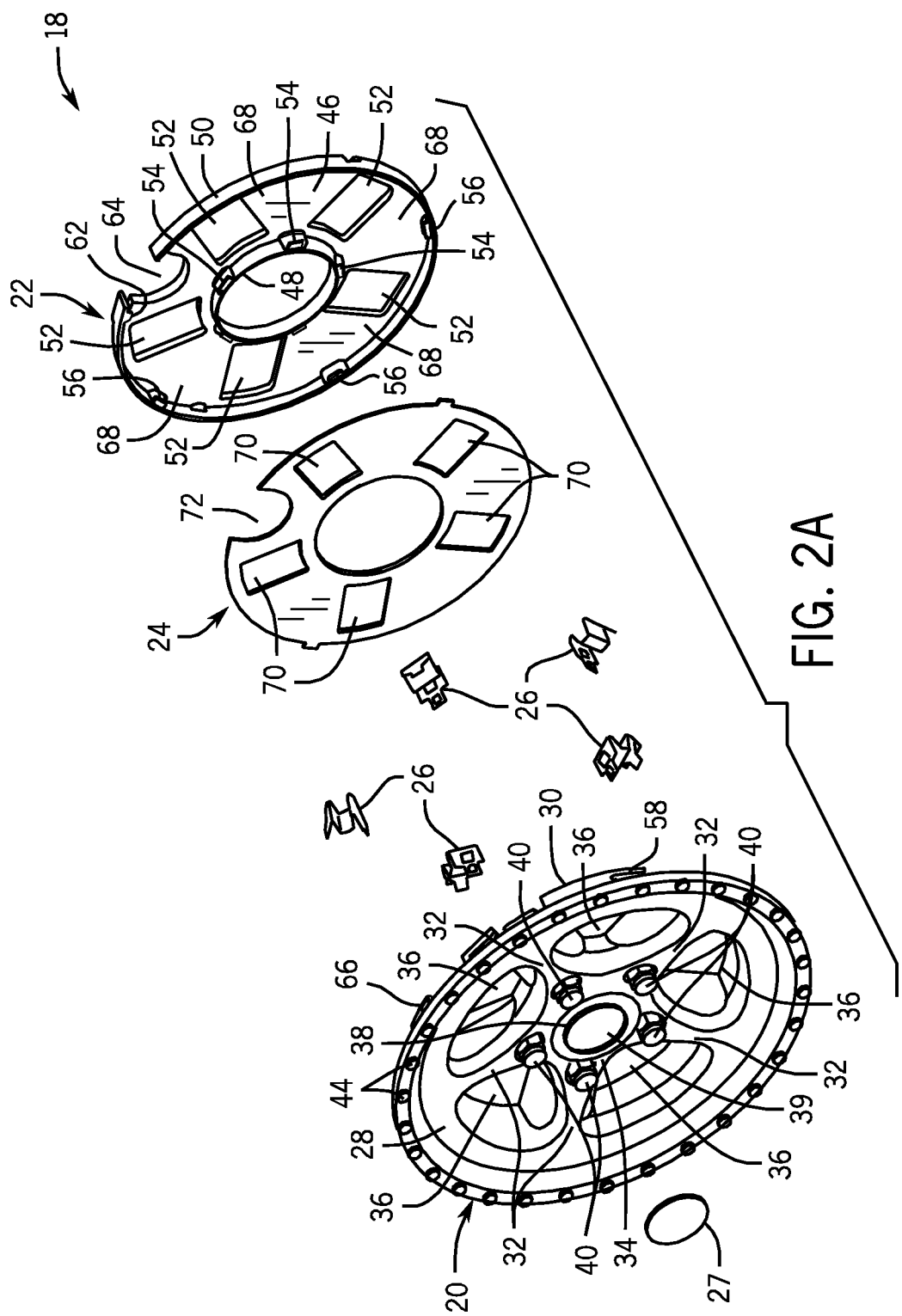
FIGS. 2A and 2B are right and left exploded perspective views of a wheel cover shown on the tractor of FIG. 1.
Figure 2B:
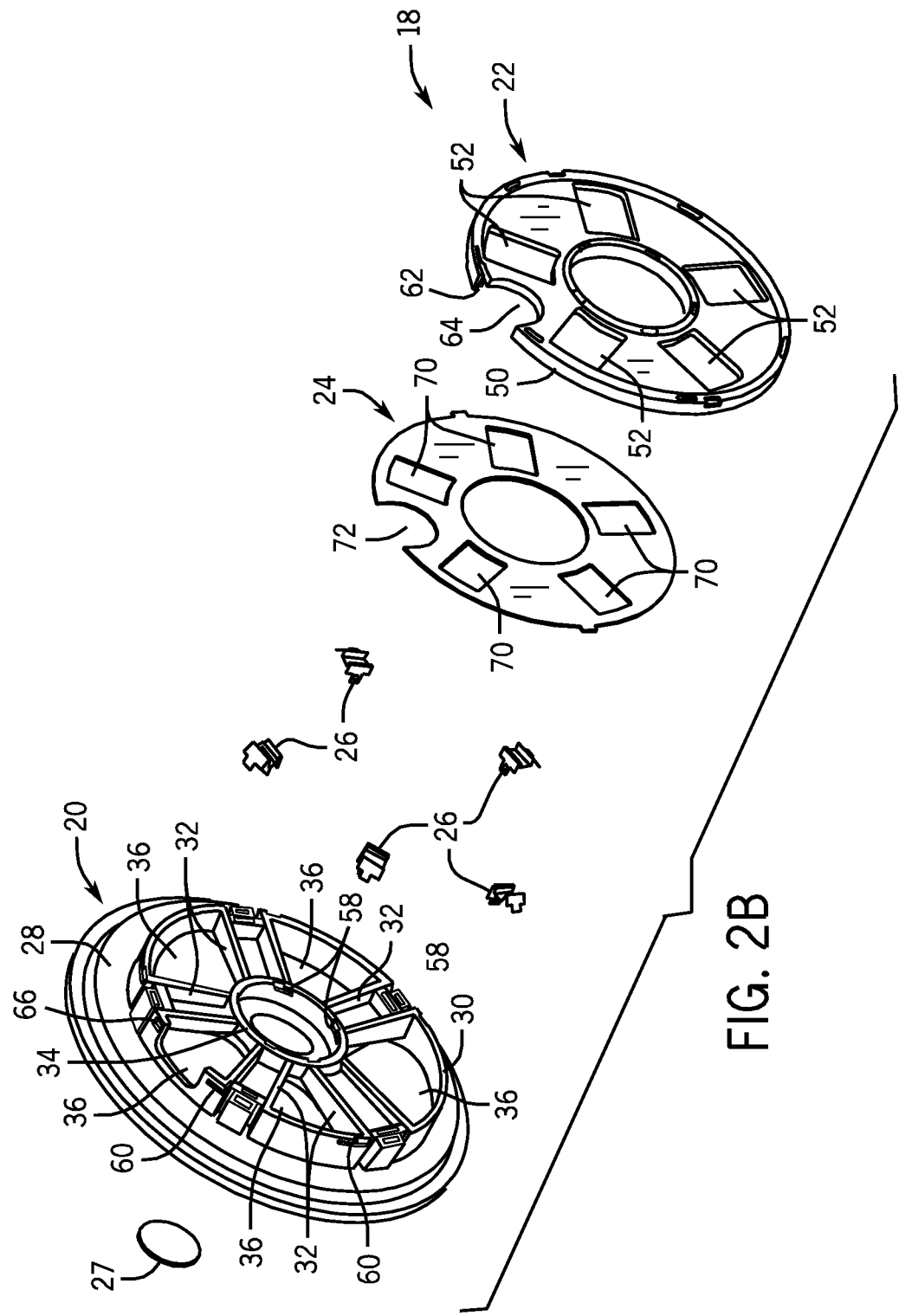

FIGS. 2A and 2B (hereinafter collectively referred to as FIG. 2) illustrate a multi-piece, wheel cover 18 configured for attachment to one or more wheels 10 of a tractor 2. Each wheel cover 18 generally includes a frame 20, a back-plate 22, a color insert 24, and a plurality of friction members 26. Wheel cover 18 may also include a decal or insert 27 glued and/or snap fit into depression 39. Friction members 26 may be fabricated from, for example, hard chrome-plated spring steel.

Frame 20 includes a circular ring 28 having a diameter which corresponds to the diameter of the respective wheel 10. Extending from the ring 28 is a skirt 30 having a diameter sized such that skirt 30 can rest within wheel 10 when wheel cover 18 is engaged with or attached to wheel 10. Also extending from the ring 28 and skirt 30 are spokes 32 (e.g. 5 spokes) which extend to and are engaged with a center hub 34. Spokes 32 may have a uniform shape, or a non-uniform shape as shown the figures.

Figure 3:
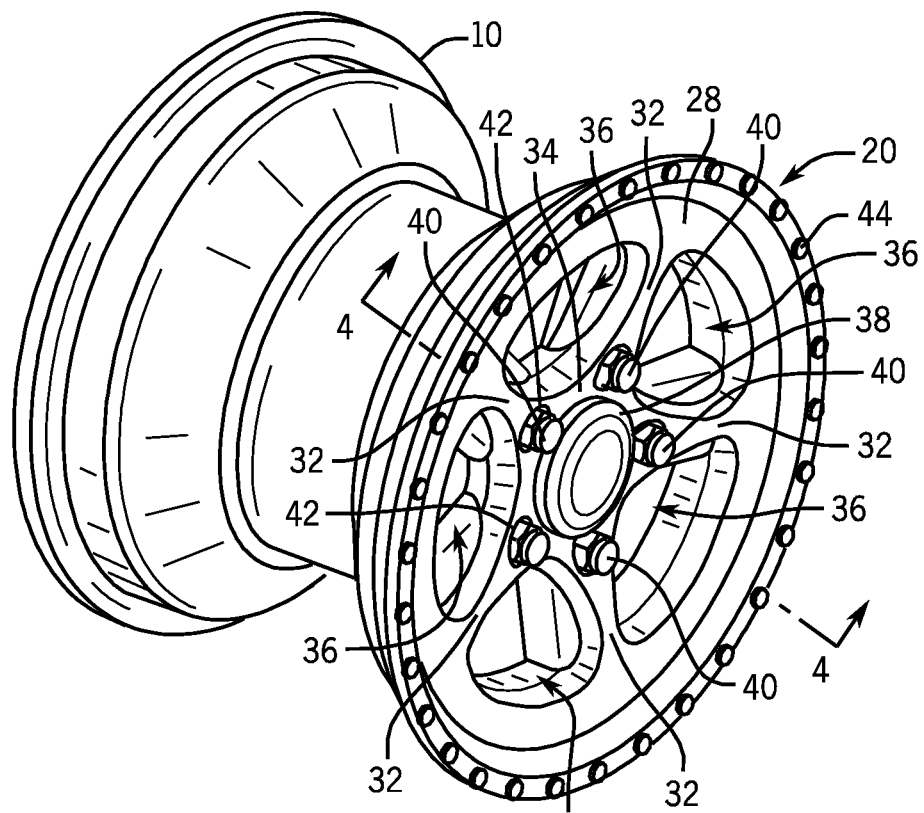
FIG. 3 is a front view of the cover attached to a tractor wheel.

Ring 28, spokes 32 and hub 34 of frame 20 define a number of openings 36 and the shape of openings 36. The number of openings 36 equals the number of spokes 32. For example if there are 5 spokes 32, frame 20 will have 5 openings 36. As shown in FIGS. 2 and 3, openings 36 have a first shape which is a triangle with rounded vertices at the outside of wheel cover 18. This first shape transitions or changes to a second shape which is a trapezoid having 2 corners which are essentially square or slightly rounded and a small side at hub 34 which is straight or slightly arced. However, by changing the shape of the ring 28, spokes 32 and/or hub 34 the opening shape can be changed. By way of another example, these shapes could be changed to generate a uniform shaped opening or an opening with a circular shape.

The area of each opening 36 is between 3.5% and 5.5% of the area defined by the outside diameter of cover 18 times $\pi$ divided by 4 ("Area"), but preferably between 4% and 5%. Cumulatively, the area of all openings 36 is between 17.5% and 27.5% of the area defined by the outside diameter of cover 18 times π divided by 4, but preferably between 20% and 25%.

Hub 34, may take a range of forms. In the embodiment of the cover 18 shown in some of the figures, hub 34 includes a slightly raised (e.g. 2 to 15 mm, preferably 7 mm or 12 inches) cylinder 38 having a diameter (e.g. 20 to 60 mm, preferably 38 mm or 47 mm). Cylinder 38 may include a circular depression 39 or other shaped depression at the top. In addition to cylinder 38, hub 34 may include a number of caped-nut extensions 40 as shown in some of the figures. Preferably there are 5 extensions 40 each associated with a spoke 32 and located in a circular recess 42. In addition to extensions 40, ring 28 may include extensions 44 which, by way of example may be generally hemispherical in shape and equi-spaced around the perimeter of cover 18 as shown in the figures.

Preferably, frame 20 is fabricated from a plastic such as ABS and includes a chrome or chrome colored surface. Injection molding of frame 20 provides a satisfactory base for a chrome surface finish. By way of example, the chrome color can be an aluminum alloy vacuum metalized to the surface. As an alternative example, the chrome surface my be provided by chemical metalizing spray chrome MT-11235 texture in select areas.

Figure 4:
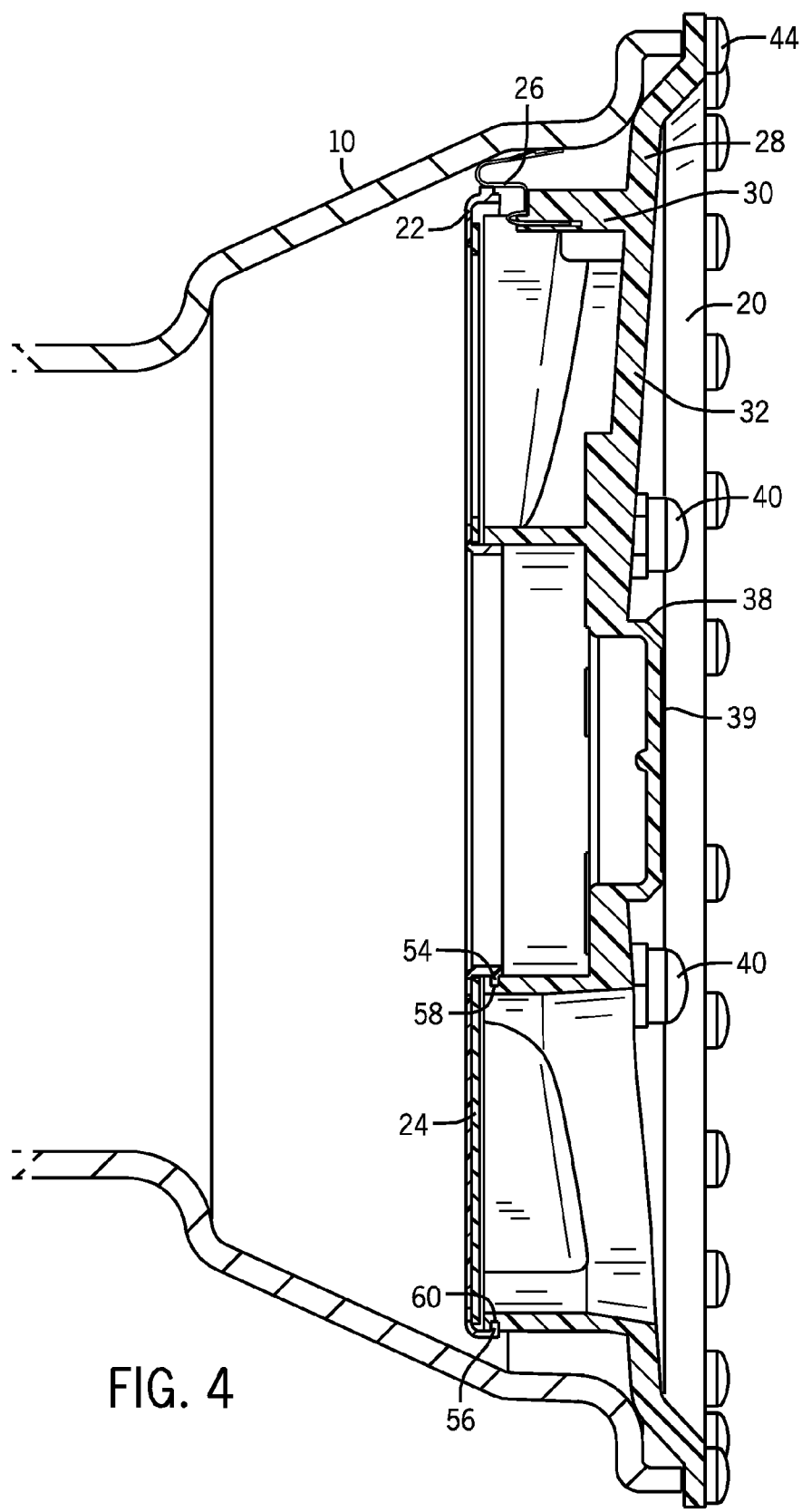
FIG. 4 is a sectional view taken along line 3-3 in FIG. 3.

Referring to FIGS. 2-4, back-plate 22 includes a ring 46 having inside and outside rims 48 and 50, respectively. Both rims 48 and 50 extend at substantially a right angle from ring 46. Ring 46 also includes openings 52 as shown. When, as discussed below, back-plate 22 is attached to frame 20, the openings are located behind spokes 32. Openings 52 may have an shape, but are similar to the shape and size of the spokes or rectangular. By properly shaping openings 52 the amount of material eliminated from plate 22 can be maximized.

Each rim 48, 50 includes a number of tabs 54, 56 (e.g. 5) as shown in the corresponding figures. Tabs 54 correspond with dog-legged slots 58 in frame 20 at hub 34. Tabs 56 correspond with dog-legged slots 60 in frame 20 on skirt 30. Rim 50 also includes a tab 62 adjacent to wheel valve opening 64. Tab 62 corresponds to an indent 66 in skirt 30. Furthermore, the inside diameter of rim 50 is sized so that rim 50 will slide over skirt 30. To attach back-plate 22 to frame 20, rim 50 is aligned with skirt 30, tabs 54 and 56 are aligned with respective dog-legged slots 58 and 60, and back-plate 22 is rotated to fully engage tabs 54 and 56 into slots 58 and 60 and cause tab 62 to engage indent 66. These structures and the engagement fix back-plate 22 to the back side of frame 20 such that each trapezoidal area 68 of back-plate 22 covers or closes a respective opening 36. With the exception of wheel valve opening 64, the combination frame 20 and plate 22 close the respective wheel 10 as shown. Accordingly, this combination can, except for the area around a tire valve, can hide or cover an unsightly wheel interior. Ideally, opening 64 would be no more that between 50% and 60% of the area of an opening 36, but preferably in the range of 53% to 55%. Alternatively, opening 36 is between 2.0% to 3% of the Area.

In addition to providing a cover for openings 36, areas 68 can be colored in a color the same as or complimentary to a selected color of tractor 2. For example, areas 68 could be white, green, red, yellow, gray, black, chrome, orange or any other appropriate color.

Preferably, back-plate 22 is injection molded from a plastic such as ABS. The color may be black and the plate 22 may include an MT 11010 texture in select areas.

As an alternative to coloring areas 68, color insert 24 may be located between frame 20 and back-plate 22, prior to attachment of plate 22 to frame 20. Insert 24 is preferably a flat plastic disc including a number of rectangular openings 70 equal in number to the number of spokes 32. Insert 20 would also include a tire valve opening 72 which coincides with opening 64 when cover 18 is assembled to include insert 24. Insert 24 can have any color on one side and the same or any different color on the opposite side. By providing different colors on opposite sides, the color of the user can be provided with 2 different colors for the closure of openings 36 with a single insert 24.

Preferably, color insert is die cut from a high impact polysterene sheet material. Example colors may be red-1807C, yellow-109C, mustard-130C and orange-173C.

Friction members 26 may be formed integrally with the frame 20 or formed separately from, but attached to frame 20. For example, in the preferred embodiment, members 26 are formed from a metal material such a spring steel and press fit into, or glued into or onto frame 20. The number of members 26 can be varied depending upon the size and type of wheel. By way of example, five members 26 are positioned relative to frame 20 as shown in FIGS. 2-4, or can be positioned differently depending upon the particular wheel with which a particular cover 18 is to be used. Referring to FIG. 4, a member 26 is shown engaged with wheel 10 while skirt 30 rest within wheel 10.

Referring to the outside diameter of ring 28, an exemplary this diameter would be between 4-12 inches. Preferably the diameter would be 6.25 inches and 9.25 inches to fit 6 and 8 inch nominal diameters riding lawnmower tractor wheels. Of course, the covers 18 could be sized to fit any size wheel In various exemplary embodiments, the relative dimensions, including angles, lengths and radii, as shown in the Figures are to scale. Actual measurements of the Figures will disclose relative dimensions and angles of the various exemplary embodiments. Various exemplary embodiments include any combination of one or more relative dimensions or angles that may be determined from the Figures. Further, actual dimensions not expressly set out in this description, can be determined by using the ratios of dimensions measured in the Figures in combination with the express dimensions set out in this description.

While a number of embodiments of my invention and modifications thereto are disclosed herein, it should be understood that the claims to our invention should be read to be given their broadest legal interpretation in view of the prior art.

We claim:

1. A wheel cover for covering substantially all of the area within the perimeter of one side of a wheel, the wheel cover comprising;
    a wheel cover frame fabricated from a material having at least a surface having a first color, the frame including;
    a circular ring having a diameter between 4 and 12 inches;
    a skirt extending from the circular ring and substantially perpendicular to the circular ring;
    the skirt including a plurality of friction members for retaining the ring in engagement with the wheel;
    a center hub;
    a plurality of spokes extending between the ring and hub to support the hub substantially at the center of the ring;
    the ring, hub and spokes defining a number of openings equal to the number of spokes, wherein the total area of the openings is between 17.5% and 27.5% of an area defined by the diameter squared times π divided by 4, and the ring, skirt, and center hub;
    an opaque cover assembly fabricated from a material having at least a surface having a second color different than the first color; and a back plate which attaches to the skirt to fasten the opaque cover assembly to the wheel cover frame on a side of the wheel cover which lies between the wheel cover and the wheel when the wheel cover is attached to the wheel, the opaque cover closing all of the openings and providing an access port for an air valve of the wheel.

2. The wheel cover of claim 1, wherein the cover frame includes a chrome colored surface which provides the first color.

3. The wheel cover of claim 2, having at least 5 spokes and the second color being one of the group of green, red, yellow, gray, black or orange.

4. The wheel cover of claim 3, wherein the diameter of the circular ring is between 7.5 and 8.5 inches.

5. The wheel cover of claim 3, wherein the diameter of the circular ring is between 5.5 and 6.5 inches.

6. The wheel cover of claim 3, wherein the frame and assemblies are molded from plastic.

7. The wheel cover of claim 6, wherein the opaque cover is molded from a plastic material having the second color.

8. A wheel kit comprising:
a pair of wheel covers, each wheel cover including;
a wheel cover for covering substantially all of the area within the perimeter of one side of a wheel, the wheel cover comprising;
a wheel cover frame fabricated from a material having at least a surface having a first color, the frame including;
a circular ring having a diameter between 4 and 12 inches;
a skirt extending from the circular ring and substantially perpendicular to the circular ring;
the skirt including a plurality of friction members for retaining the ring in engagement with the wheel;
a center hub;
a plurality of spokes extending between the ring and hub to support the hub substantially at the center of the ring;
the ring, hub and spokes defining a number of openings equal to the number of spokes, wherein the total area of the openings is between 17.5% and 27.5% of an area defined by the diameter squared times $\pi$ divided by 4, and the ring, skirt, and center hub;
an opaque cover assembly fabricated from a material having at least a surface having a second color different than the first color; and
a back plate which attaches to the skirt to fasten the opaque cover assembly to the wheel cover frame on a side of the wheel cover which lies between the wheel cover and the wheel when the wheel cover is attached to the wheel, the opaque cover closing all of the openings and providing an access port for an air valve of the wheel; and
a package which at least partially encloses and supports the wheel covers relative to each other, the package including a hanging device which permits hanging of the package on a rack.

9. The kit of claim 8, wherein the plurality of spokes are equally spaced spokes extending between the ring and the center hub.

10. The kit of claim 9, wherein the wheel cover frames include a chrome colored surface which provides the first color.

11. The kit of claim 10, wherein the wheel cover frames have at least 5 spokes and the second color being one of the group of green, red, yellow, gray, black or orange.

12. The kit of claim 10, wherein the diameter of the circular ring is between 7.5 and 8.5 inches.

13. The kit of claim 10, wherein the diameter of the circular ring is between 5.5 and 6.5 inches.

14. The kit of claim 9, wherein the frame and assemblies are molded from plastic.

15. The kit of claim 10, wherein the opaque covers are molded from a plastic material having the second color.

* * * * *